No. 725,183. PATENTED APR. 14, 1903.
W. WAINRIGHT.
WHIFFLETREE HOOK.
APPLICATION FILED FEB. 19, 1903.

NO MODEL

Witnesses
E. F. Stewart
C. N. Woodward

William Wainright, Inventor.
by
Attorneys

UNITED STATES PATENT OFFICE.

WILLIAM WAINRIGHT, OF WINCHESTER, ILLINOIS.

WHIFFLETREE-HOOK.

SPECIFICATION forming part of Letters Patent No. 725,183, dated April 14, 1903.

Application filed February 19, 1903. Serial No. 144,112. (No model.)

*To all whom it may concern:*

Be it known that I, WILLIAM WAINRIGHT, a citizen of the United States, residing at Winchester, in the county of Scott and State of Illinois, have invented a new and useful Whiffletree-Hook, of which the following is a specification.

This invention relates to devices employed upon whiffletrees for supporting the traces in position thereon and commonly known as "whiffletree-hooks," and has for its object to provide a simple and inexpensive device of this character which may be readily attached to and used in connection with any of the various forms of whiffletree ends in common use without requiring any change in the structure or form of the whiffletree or the traces.

The invention consists in certain novel features of construction, as hereinafter shown and described, and specified in the claims.

Figure 1:
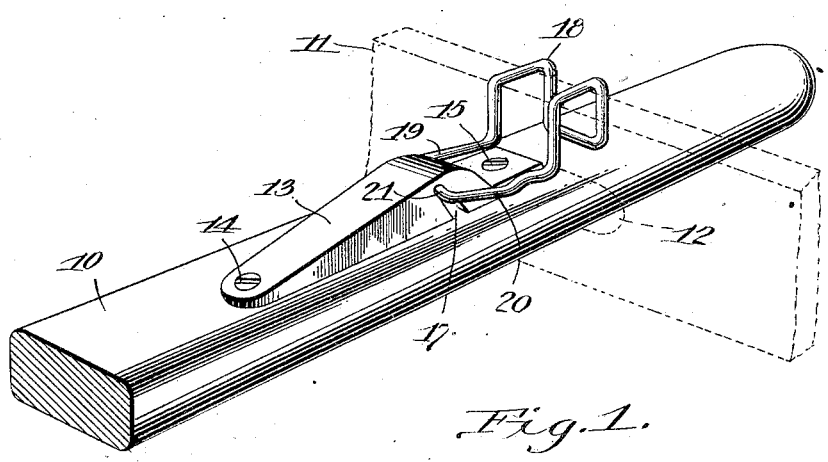
Figure 2:
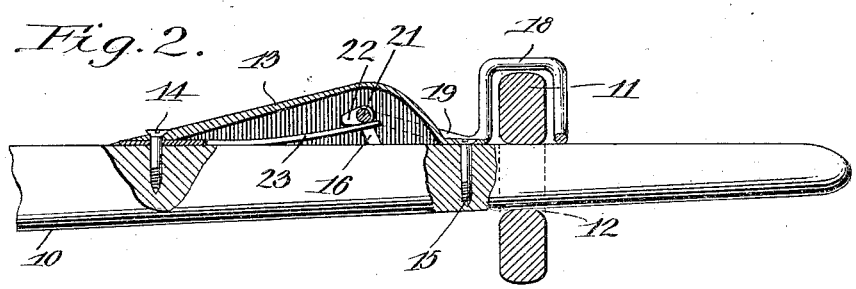
Figures 3, 4:
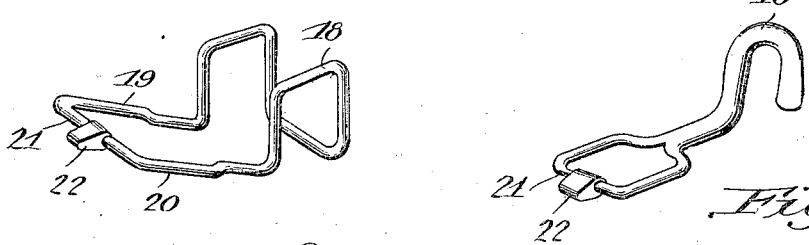

In the drawings illustrative of the invention, in which corresponding parts are denoted by like designating characters, Figure 1 is a perspective view of the invention applied. Fig. 2 is an enlarged longitudinal sectional side elevation. Fig. 3 is a perspective view of the trace-engaging-hook portion of the device detached. Fig. 4 is a view similar to Fig. 3, illustrating a modification in the construction of the hook.

A section of the whiffletree end is indicated at 10 and a section of the trace at 11, provided with the aperture 12 for the whiffletree end, these parts being of the usual construction.

The improved attachment consists of a housing 13, open at the lower side and secured to the whiffletree, as by screws 14 15. The housing is provided with oppositely-disposed slots 16 17, opening against the whiffletree and preferably inclined rearwardly or toward the body of the whiffletree, as shown.

The trace-engaging hook is formed with a trace-spanning outer end 18 and with spaced side members 19 20, extending upon opposite sides of the housing and connected by a transverse end bar 21, engaging the slot 16 17, as shown. The bar 21 is provided with a laterally-extended lug 22 within the housing, as shown, and also within the housing is secured a spring 23, engaging the lug and supporting the bar 21 and the hook, of which it forms a part, in position within the slots and likewise operating to maintain the hook yieldably both in its open and closed position. The lug 22 extends rearwardly of the bar 21 and at a downward angle therefrom when the hook is closed, as shown in Fig. 2, and extends forwardly of the bar and at an upward angle therefrom when the hook is open, so that the spring will effectually act thereon, as will be obvious. The spring will preferably be secured by the same screw 14 which secures the rear end of the housing and stands, therefore, at an upward incline to the plane of the whiffletree and exerts its force to maintain the bar 21 in proper position in the housing and obviates the necessity for any other fastening means between the hook and housing.

The trace-engaging hook may be constructed as shown in Fig. 4, if preferred; but this would not be a departure from the principle of the invention, as the construction is substantially the same and the results produced are the same.

The device is adapted to any of the various forms of whiffletrees and traces in common use and will not require any change in the form or structure of either the whiffletree or trace.

The device is very simple, strong, and durable, of few parts, and not liable to get out of order and will securely and safely hold the trace in place.

Having thus described the invention, what I claim is—

1. A whiffletree attachment comprising a housing adapted for attachment to the whiffletree and having oppositely-disposed slots in its side walls opening against the whiffletree, a trace-retaining hook having spaced side members extending upon opposite sides of the housing and provided with a transverse bar movably engaging said slots, said bar having a lug extending therefrom, and a spring within the housing engaging said lug and operating to maintain said hook member yieldably in closed or open position, substantially as described.

2. A whiffletree attachment comprising a housing adapted for attachment to the whiffletree and having oppositely-disposed slots in its side walls opening against the whiffletree and inclined rearwardly, a trace-retaining hook having spaced side members extending upon opposite sides of the housing and provided with a transverse bar movably engaging said slots, said bar having a lug extending therefrom, and a spring secured by one end between the housing and whiffletree and with the other end engaging said lug and operating to support said hook member movably in position and maintain it yieldably in its closed or open position.

3. A whiffletree attachment comprising a housing adapted for attachment to the whiffletree and having oppositely-disposed slots in its side walls opening against the whiffletree, a trace-retaining hook formed of a single piece of wire with spaced side members connected by transverse end bars, one of said end bars having a lateral lug and movably engaging said slots, and a spring within said housing engaging said lug and supporting said hook member movably connected to said housing and operating to maintain it yieldably in its closed or open position, substantially as described.

In testimony that I claim the foregoing as my own I have hereto affixed my signature in the presence of two witnesses.

WILLIAM WAINRIGHT.

Witnesses:
HARDY D. TRICKEY,
C. H. CONDIT.